SYSTEM AND METHOD FOR RECORDING AND REPRODUCING INFORMATION

Filed June 7, 1961

4 Sheets-Sheet 1

EARL R. HIBBARD &
ALEXANDER R. MAXEY
INVENTORS

BY Nathan N. Kallman

ATTORNEY

SYSTEM AND METHOD FOR RECORDING AND REPRODUCING INFORMATION

Filed June 7, 1961

EARL R. HIBBARD &
ALEXANDER R. MAXEY
INVENTORS

BY Nathan N. Kallman

ATTORNEY

April 27, 1965 E. R. HIBBARD ETAL 3,180,929

SYSTEM AND METHOD FOR RECORDING AND REPRODUCING INFORMATION

Filed June 7, 1961

4 Sheets-Sheet 3

EARL R. HIBBARD &
ALEXANDER R. MAXEY
INVENTORS

BY Nathan N. Kallman

ATTORNEY

EARL R. HIBBARD &
ALEXANDER R. MAXEY
INVENTORS

BY Nathan N. Kallman
ATTORNEY 3,180,929

SYSTEM AND METHOD FOR RECORDING AND REPRODUCING INFORMATION

Earl R. Hibbard, Sunnyvale, and Alexander R. Maxey, Redwood City, Calif., assignors to Ampex Corporation, Redwood City, Calif., a corporation of California Filed June 7, 1961, Ser. No. 115,509
12 Claims. (Cl. 178—6.6)

Figure 1:
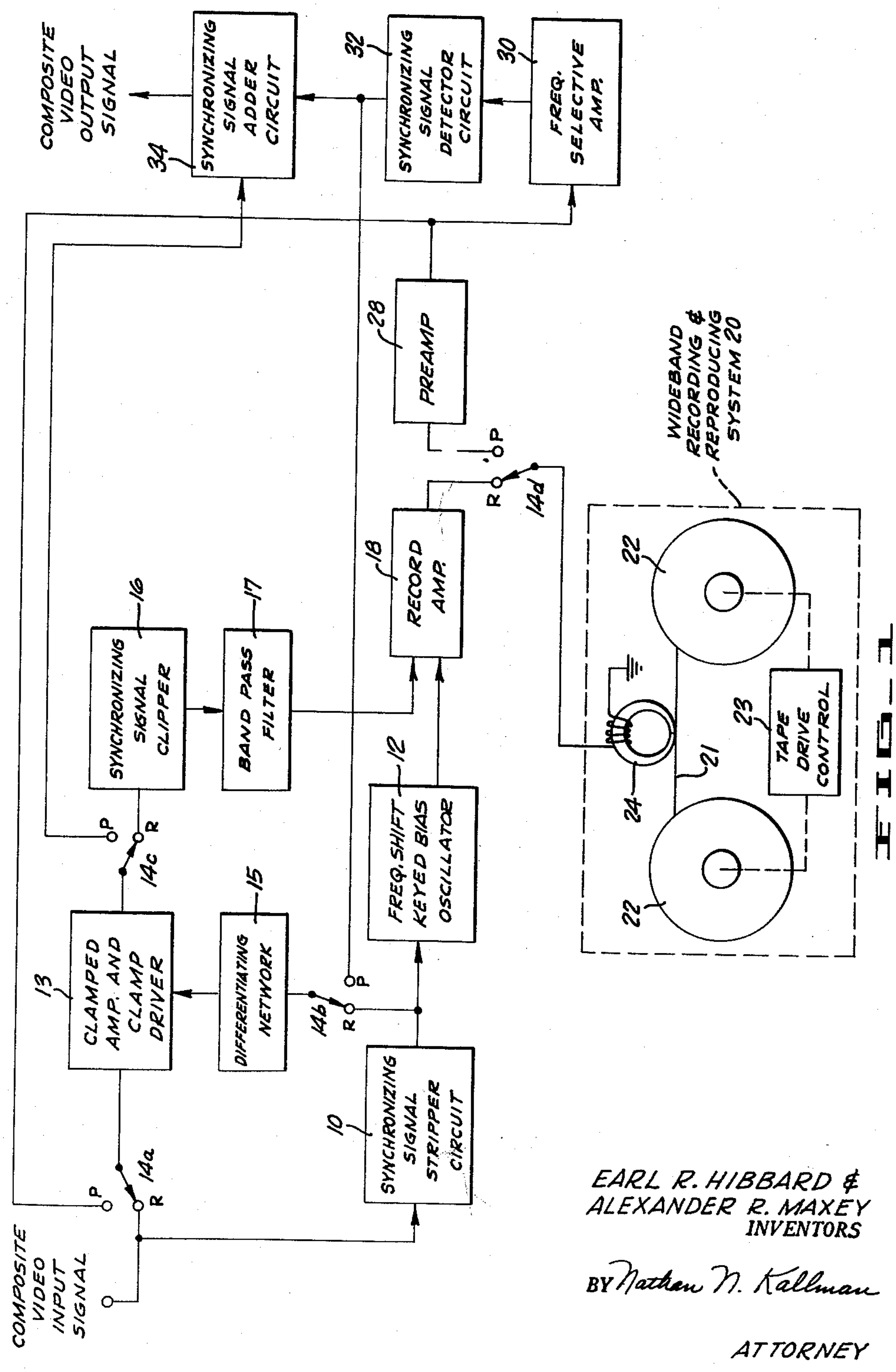

This invention relates to systems and methods for recording and reproducing information in electrical signal form, and more particularly to system and methods for recording composite signals which include synchronizing signals.

In recording and reproducing signals which present information, it is very often necessary to use a wide frequency band extending from very low frequencies (a few cycles per second or essentially direct current components) to very high frequencies (several megacycles). The use of this broad band may be used for video recording, and perhaps the best example involves the composite television signal utilized in television picture broacasting. The television signal includes both video signal portions and synchronizing signal portions, with the video signal portions providing the desired picture information and covering a wide frequency band while the synchronizing signal portions consist of precisely formed and spaced pulses which meet predetermined shape and amplitude standards.

In order to provide sufficient response across the frequency band, systems for recording and reproducing information have heretofore used frequency modulation of the video signal. In order to economize and simplify these recording systems, however, attempts have been made to record the composite signal directly, thus eliminating the need for frequency modulation and demodulation. A serious difficulty encountered here is that the magnetic heads which have best response in the high end of the video frequency band, as is necessary for good recording and reproduction, have limited frequency response at the low end of the video frequency band. It is therefore difficult to use direct current (hereinafter D.C.) restoration or clamping so as to maintain a good low frequency response and a reasonably consistent D.C. level.

Heretofore, the consistent D.C. level has been achieved by the use of a keyed clamping operation, in which the composite video signal is adjusted to a selected level during keying intervals which are established by synchronizing signals which are stripped from the composite video signal. Magnetic heads which have a sufficiently good high frequency response, however, will have a low end cut off at an appreciable frequency level, perhaps 1 kilocyle (kc.). The response of the magnetic head is not such, therefore, as to permit use of the stripped synchronizing signal for control of the keyed clamping operation.

It is therefore an object of the present invention to provide an improved system for recording and reproducing a wide frequency range of signals with a consistent D.C. level.

Another object of the present invention is to provide an improved recording and reproducing system for composite video signals which include synchronizing signals.

Yet another object of the present invention is to provide an improved recording system, for direct recording of video signals, and for accurate representation of the synchronizing signal portions for subsequent reproduction.

A further object of the present invention is to provide an improved signal reproducing system, for maintaining a consistent D.C. level and for accurately generating a composite video signal containing both video portions and synchronizing signal portions.

A still further object of the present invention is to provide methods for recording and reproducing a wide frequency band of signals with a magnetic head having limited frequency response.

Systems and methods in accordance with the present invention maintain a consistent D.C. level in recording and reproducing composite video signals by substituting, for each synchronizing pulse, an oscillatory burst at a frequency which is above the upper limits of the frequency band being recorded but within the frequency response limits of the magnetic transducer which is employed. On reproduction, the oscillatory bursts are utilized in generating pulse envelopes which correspond to the original synchronizing signals and which are suitable for controlling D.C. restoration by keyed clamping techniques, and for reinserting the synchronizing signal.

In a specific example of a system in accordance with the invention, composite video signals are recorded on magnetic tape by a transducer, the upper operating response limit of which is in excess of the upper limit of the frequency band of the signals being recorded. The composite video signals contain synchronizing pulses which are selected by a synchronizing signal stripper circuit. The magnetic transducer is normally A.C. biased by a frequency shift keyed oscillator which provides signals at a frequency to which the transducer does not respond during Playback operation as a result of the large dimension of the transducer gap with respect to the recorded bias wavelength. Under control of synchronizing signals provided from the synchronizing signal stripper circuit, however, the oscillator is frequency shift keyed to operate at a lower frequency which is above the frequency band utilized for the composite video signals but still within the Playback response range of the transducer. Thus, in place of the synchronizing pulses, the recorded signal information contains oscillatory bursts at the lower frequency from the frequency shift keyed oscillator. On reproduction of this information registered on the magnetic tape, the composite video signal containing the oscillatory bursts is applied to a clamped amplifier which is used to effect D.C. restoration. The oscillatory bursts are selected by a frequency selective amplifier, output signals from which are applied to a synchronizing signal detector which provides a pulse envelope to control the clamped amplifier. The pulse from the synchronizing signal detector is also applied to a synchronizing signal adder circuit which receives signals from the clamped amplifier and which reinserts the synchronizing signals, thus reconstituting the full composite video signal.

Figure 2:
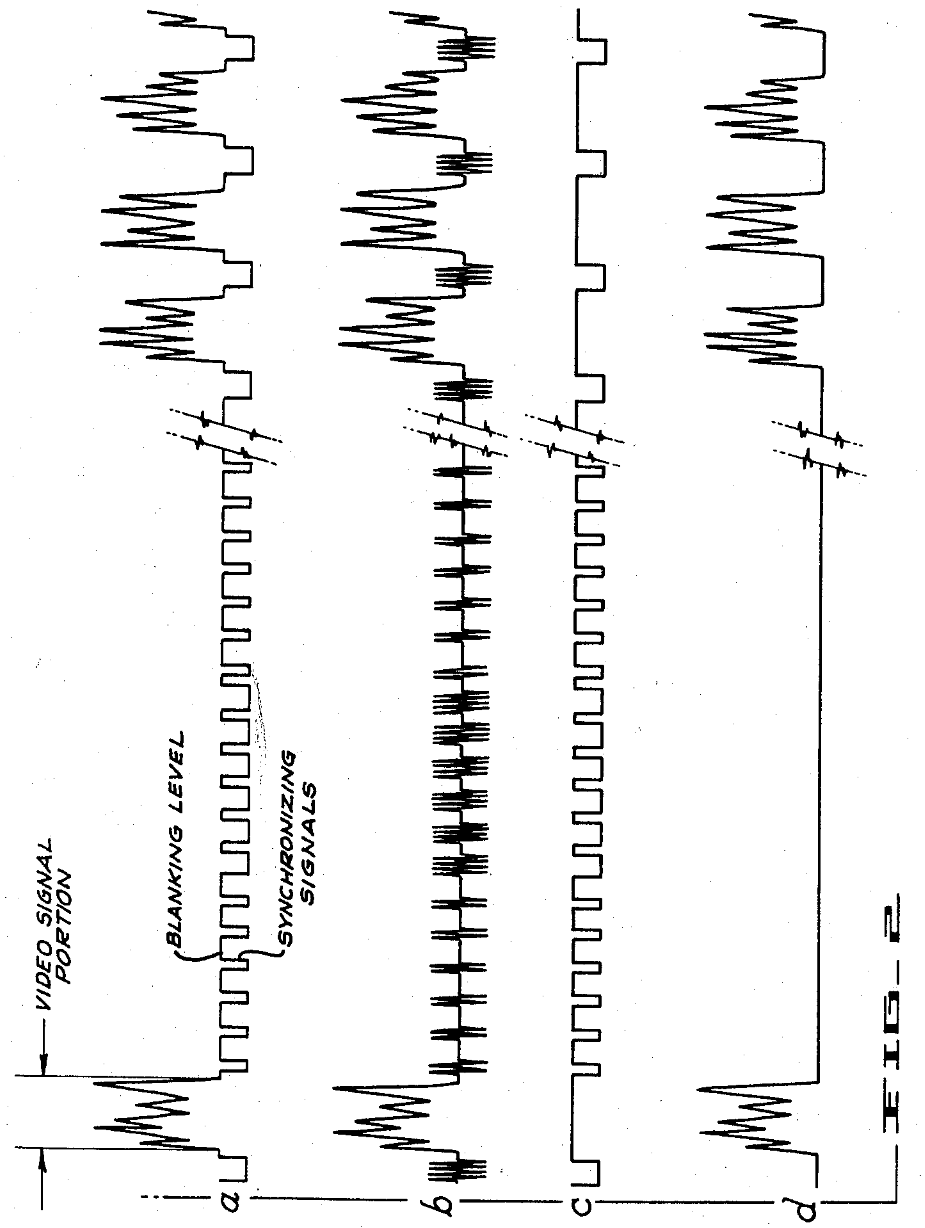
Figure 3:
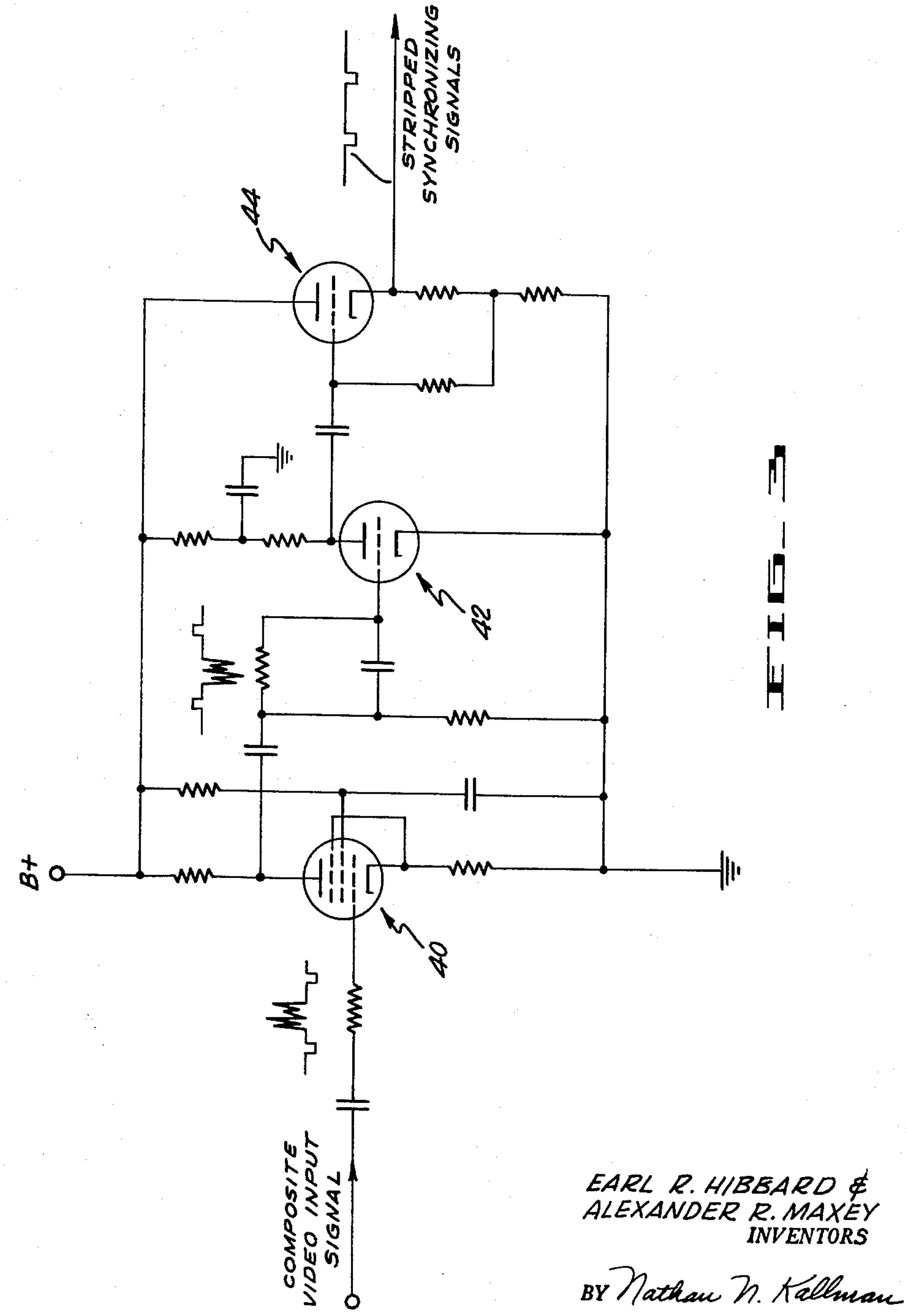
Figure 4:
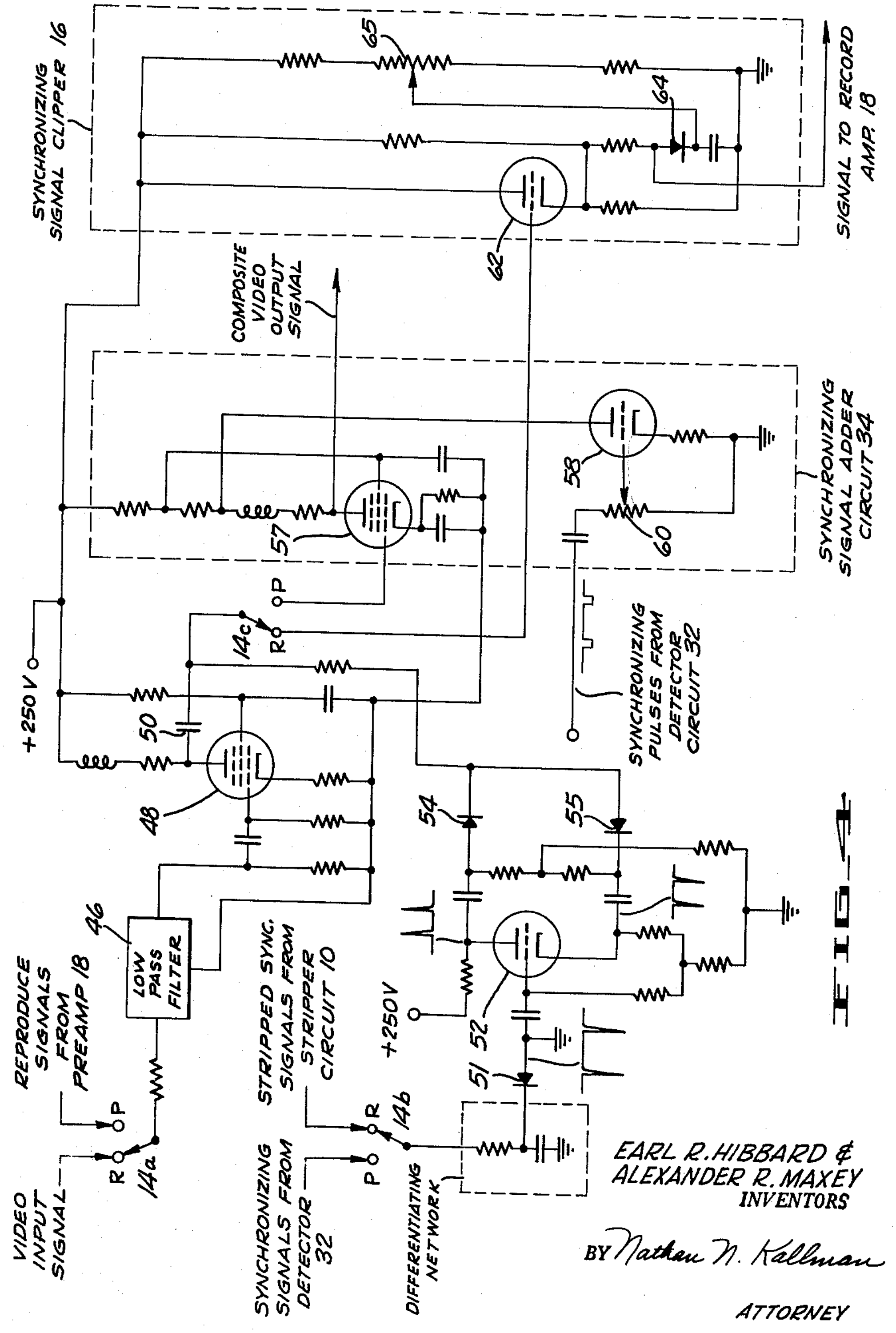

A better understanding of the invention may be had by reference to the following description, taken in conjunction with the accompanying drawings, in which:

FIG. 1 is a block diagram of a magnetic recording and reproducing arrangement in accordance with the invention;

FIG. 2, comprising waveforms 2(A) to 2(D), illustrates various signal waveforms occurring at different points during the operation of the arrangement of FIG. 1;

FIG. 3 is a schematic diagram of a synchronizing signal stripper circuit which may be employed in the arrangement of FIG. 1, and FIG. 4 is a schematic circuit diagram of a clamped amplifier and clamp driver circuit which may be employed in the arrangement of FIG. 1.

Systems in accordance with the present invention provide accurate signal recording and reproduction of synchronizing signal components in a composite video input signal. Taking the example of the composite television signal, precisely spaced and timed horizontal and vertical synchronizing signals are to be superimposed on blanking signal levels. This is an example merely, because the term "composite video signal" should be taken to include other tepes of signals which embrace a wide frequency range, utilize synchronizing or timing signals and require that a consistent D.C. level be maintained. It is assumed in the present instance that the video frequency band to be recorded extends from a few hundred cycles per second to approximately 4 megacycles (hereinafter mc.). It is assumed also that the system is to provide direct recording of the composite video signal.

With reference to FIGURE 1, composite video input signals are applied at an input terminal to a synchronizing signal stripper circuit 10, which may be of any of a number of well known types. The synchronizing signal stripper circuit 10 provides output signals in the form of time-spaced pulses representing the synchronizing signals alone. The initial relationships in time and in amplitude of the video signal portions of the composite signal to the synchronizing signal portions may be seen by reference to waveform 2A in FIG. 2. Although the waveform shown represents a monochrome television signal, the color television signal is essentially the same except for the addition of color bursts on the back porch of each horizontal blanking interval. It should be recognized that the video signal is sometimes represented inverted from that shown, with the synchronizing signal appearing as positive-going deviations from the blanking level, but this is strictly a matter of choice as to the convention adopted. For convenience, horizontal synchronizing pulses, vertical synchronizing pulses, and equalizing pulses will all be referred to as synchronizing signals.

The synchronizing signals from the stripper circuit 10 act as control input signals for a frequency shift keyed bias oscillator 12, which provides an A.C. bias signal for recording purposes at a frequency of 10 mc. in the absence of the control input signals. When a control input signal is provided to a control input terminal of the oscillator 12, the oscillator 12 changes to a different characteristic frequency, or "shifts" to provide a signal at a frequency of 4 mc.

The composite video signal is also applied to a keyed clamping circuit in the form of a clamped amplifier and clamp driver 13 which is used in both recording and playback of the signal. A switch 14, here a four-pole double throw switch whose four armatures are designated 14*a*, 14*b*, 14*c*, and 14*d*, is operated to select either Record "R" or Playback "P" contacts to control the mode of operation. With the recording mode chosen, as shown, the input signals are applied through armature 14*a* to the clamped amplifier and clamp driver circuit 13, a detailed example of which is shown in FIG. 4. Signals to control the clamping action are applied from the stripped synchronizing signals to a differentiating network 15 through armature 14*b* and then to the clamped amplifier and clamp driver 13. The keyed clamping action provided by the circuit 13 maintains a selected D.C. level in the composite signal prior to recording, the composite signal then being applied to a synchronizing signal clipper circuit 16 through armature 14*c*, so that the synchronizing pulses are removed. Components other than video are further attentuated by a band-pass filter 17 whose pass band encompasses the video frequency band. In a practical example, lower and upper limits of 400 cycles and 4 mc. have been employed. The frequencies and band limits may of course be varied with the video band and the magnetic head which are used. Signals passed by the band-pass filter 17 are applied along with signals from the bias oscillator 12 to a record amplifier 18 coupled to a wide band recording and reproducing system 20 through armature 14*d*. In the recording and reproducing system 20 a magnetic tape 21 is moved between a pair of drive reels 22 by a tape drive control 23, these elements being conventional and shown only in generalized form.

A magnetic record and playback transducer or head 24, disposed in operative relation adjacent to the tape 21, includes a coil 25 coupled to receive signals to be recorded from the record amplifier 18 through the armature 14*d*. In the alternative mode the armature 14*d* couples the reproduced signals excited in the coil 25 to a preamplifier 28. In order to record the composite video signal directly, the magnetic head must have good frequency response in the upper portion of the video frequency range. In accordance with the present invention, the head is selected so as to have some response from 4 to 5 mc. but substantially no response at 10 mc. on playback. With good response at approximately 4 mc., the magnetic head 24 provides sufficient capability for use of the 5 mc. signal for keyed clamping operations on playback.

The normal 10 mc. bias signal does not appear in the reproduced signals at any time, but is merely used in conventional fashion. The 5 mc. bias signal is, however, reproduced and employed for special purposes in accordance with the invention. Rather than, as described above, employ a particular head design for both recording and reproduction, separate heads (not shown) may be used for these functions. In another form, the relationship between the normal bias frequency and the head gap may also be selected so that gap losses on playback effectively reduce the bias signal to below a selected minimum. By changing the frequency shift keyed oscillator the normal bias frequency may be selected to be further outside the frequency band being recorded. Note that separate oscillations and electronic switching may also be employed. Reference may be made to any standard texts for a fuller appreciation of these details. See, for example, the book "Magnetic Recording Techniques" by Stewart, published 1958 by the McGraw-Hill Book Company, Inc., New York, as to considerations pertaining to the magnetic heads. Although the oscillation means, the frequencies employed and the magnetic heads may be varied in accordance with the invention, it is preferred to use the arrangement shown.

Playback signals derived from the magnetic head 24 and directed through the preamplifier 28 are applied to a circuit which reconstitutes the composite television signal and provides a consistent D.C. level in the video signal portions. Two signal branches are established, in one of which the signals are provided to a tuned or frequency selective amplifier 30 which is responsive to signals at 5 mc. Output signals from the frequency selective amplifier 30 drive a synchronizing signal detector circuit 32, which may be a diode detector, to provide a signal defining the pulse modulated envelope of the oscillatory bursts in the synchronizing signals. The signals having these pulse envelopes operate the keyed clamping circuit, which forms part of the other signal branch, and also control reinsertion of the synchronizing signals. From the synchronizing signal detector circuit 32 the pulses are applied to the control input of the clamped amplifier and clamp driver 13 through the armature 14*b* and differentiating circuit 15 as the reproduced signal is coupled to the signal input of the circuit 13 through the armature 14*a*. The selectively clamped output signals from the circuit 13 are coupled through the armature 14*c* to a synchronizing signal adder circuit 34 which superimposes the synchronizing signal pulses from the detector 32 so as to complete the final reconstitution of the composite television signal.

As the system operates during recording, the composite video signal represented in FIG. 2(A) is re-formed so that oscillatory bursts at 5 mc., as shown in waveform 2(B), are substituted for the various synchronizing pulses. The normal A.C. recording bias frequency of 10 mc. from the bias oscillator 12 provides enhanced recording operation, in accordance with conventional magnetic recording techniques, but is not of material effect in the recorded signal. During the synchronizing pulse intervals, however, the stripped synchronizing pulses act as control input signals for the frequency shift keyed bias oscillator 12, and oscillatory bursts at 5 mc. are applied to the magnetic head 24. In effect, the oscillatory bursts are substituted for the synchronizing signals which are removed by the clipper circuit 16. The durations and times of occurrence of the oscillatory bursts, which are recorded by the head 24, waveform 2(B), therefore continue to define the synchronizing pulses.

When the recorded signals are reproduced, the oscillatory bursts appear in the place of the synchronizing signals, as shown by the composite waveform 2(B). The composite reproduced signals of waveform 2(B) are applied to the frequency selective amplifier 30 which, however, responds only to the segments of the signal which are at the 5 mc. frequency. The coupled envelope detector circuit 32 provides rectangular pulses which delineate the intervals of the 5 mc. oscillatory burts, and which in effect regenerate the synchronizing signals (FIG. 2(C)). The re-established synchronizing signals are then used to control restoration of the D.C. level, and reinsertion of synchronizing signal portions of the composite video signal.

The D.C. restoration may be accomplished in a number of different ways, but it is preferred to use pulse spikes, derived from the differentiating network 15, whose times of occurrence are governed by the synchronizing pulses, and whose amplitudes and polarities are governed by the amplitude of signals in the clamped amplifier and clamp driver 13. Such signals, generated in a manner described in more detail with reference to FIG. 4, are provided as control input signals to the clamped amplifier and clamp driver circuit 13. The output signal subsequently derived at the output terminal of the clipper circuit 16 contains only the video signal portions of the original signal, with D.C. restoration, as shown by the waveform of FIG. 2(D). Both the video signal portions and the synchronizing signal portions of the original signal are applied in their original time relation to the synchronizing signal adder circuit 34, which superimposes the synchronizing signals so as to fully reconstitute the composite television signal. This signal is the final output signal derived from the system, with precise D.C. restoration and proper synchronization.

Methods in accordance with the present invention may therefore be seen to utilize a magnetic head having a known frequency response with an upper limit which is above the upper limit of the frequency band of the signals to be recorded and reproduced. For each synchronizing signal an oscillatory burst is generated at a frequency which is between the upper limit of the frequency band being recorded and the upper limit of the frequency response of the magnetic head. This oscillatory burst is applied in lieu of the normal A.C. bias signal, which is used only to enhance recording. On reproduction of the signals, the oscillatory bursts are separated and used to generate pulses which initiate a keyed clamping action by which the video signal is restored to a desired D.C. level, and also redefine the synchronizing signal which is then reinserted to form the full composite television signal.

An example of a synchronizing signal stripper circuit which may be employed in systems in accordance with the invention is shown in FIG. 3. The principal elements of the stripper circuit are a pentode amplifier 40, an inverter amplifier 42 and a cathode follower 44 coupled together in successive stages. The circuit need not be described in full detail inasmuch as conventional bias and coupling circuits may be used between the stages and within each stage. The composite television signal is provided to the control grid of the pentode amplifier 40, and inverted output signals taken from the plate of the pentode amplifier 40 are applied in turn to the control grid of the inverter amplifier 42. The inverter amplifier 42 is biased so as to be normally at or near cutoff, so that the then negative-going video signal portion of the signal which is applied to its control grid is effectively clipped from the signal derived at its plate. Therefore, only the synchronizing signal portions produce output signal variations (negative-going pulses) to drive the cathode follower 44 in the following stage.

The stripped synchronizing signals appear as negative-going pulses at the output terminal of the stripper circuit of FIG. 3.

Circuits which are particularly suitable for performing the functions of the clamped amplifier and clamp driver circuit 13, the differentiating network 15, the clipper circuit 16 and the synchronizing signal adder circuit 34 of FIG. 1 are shown in the schematic diagram of FIG. 4. Here again a detailed description has been omitted for simplicity, it being understood that those skilled in the art will appreciate the specific design features which may be employed.

A number of different input signals are applied to the circuits shown in FIG. 4. One input signal is the reproduced signal which contains the 5 mc. oscillatory bursts and which is provided from the preamplifier 28 through the armatures *14a* during the playback mode. During the record mode, as shown, the applied signal is the video input signal instead of the reproduced signal. In both modes the applied signal properly represents the video signal portions of the composite television signal but requires D.C. restoration. Other signals which are used in the keyed clamping circuit are the synchronizing signals provided from the stripper circuit 10 or the detector 32 to the differentiating network 15.

The reproduced or input signals are passed through a low pass filter 46, which blocks the oscillatory bursts if they are present, to the control grid of a pentode amplifier 48, the plate of which is connected to a 2000 picofarad capacitor 50 on which D.C. restoration is effected by applying keyed pulses of appropriate polarity to adjust the charge on the capacitor 50 to a selected level at each synchronizing pulse. The synchronizing pulses are formed into time marker spikes by the differentiating circuit 15 and a clipper diode 51 which passes only the negative-going spikes coincident with the leading edges of the successive synchronizing pulses. The marker spikes are applied within the clamp driver part of the circuit, to a phase splitter circuit 52, consisting of a triode which provides positive-going voltage spikes of a selected amplitude at its plate and negative-going voltage spikes of like amplitude at its cathode. These marker spikes remain coincident with the leading edge of the initiating synchronizing pulses. The D.C. level of the capacitor 50 is then used to establish the operating bias on a pair of appropriately poled semiconductor diodes 54, 55 which are coupled to the phase splitter 52. With the diodes 54, 55 coupled together in series, and with the bias maintained exactly at a desired intermediate level by a coupling from the capacitor 50 to the midpoint between the diodes 54, 55 the concurrent positive and negative pulses do not affect the charge on the capacitor 50 and the D.C. level of the circuit. When this D.C. level shifts due to drift of the operating point, however, the capacitor 50 causes a like shift in the bias on the diodes 54, 55. When the equal but oppositely poled pulses are applied, one of the diodes 54 or 55 conducts more than the other so that a corrective signal variation is applied from the clamp driver to the capacitor 50. Thus the D.C. restoration is effected at each synchronizing pulse. Because substantially like signals are applied during both record and playback modes, the circuit operation is the same in both modes. The values of the circuit elements are selected to maintain the D.C. level substantially consistent until the next signal from the clamp driver is supplied.

After D.C. restoration the video signals are applied through the armature *14c* to either the synchronizing signal adder circuit 34 or the synchronizing signal clipper circuit 16. In the playback mode, the composite video output signal is derived from the adder circuit 34, at the plate of a pentode amplifier 57 to which the synchronizing signal is added. Negative-going synchronizing pulses from the detector circuit 32 are applied to the control grid of an inverter amplifier 58 whose plate circuit shares a portion of the plate load of the pentode amplifier 57 and whose grid circuit includes an adjustable resistor which may be varied to change the amplitude of the synchronizing signal in the composite television signal. Voltage variations at the plate of the inverter amplifier 58 are superimposed on the voltage variations at the plate of the pentode 57, so that the synchronizing pulses are reinserted in the composite television signal in place of the oscillatory bursts, and the signal is full reconstituted.

In the record mode, the signal from the clamped amplifier 13 which is applied to the clipper circuit 16 still contains the synchronizing pulses (here positive-going because of inversion in the pentode amplifier 43). The signals for the record amplifier are derived from a cathode follower 62 to which is coupled a clipper circuit including a diode 64 biased to provide a selectable clipping level by a potentiometer 65. Parts of the signal above the clipping level are thus removed, and only the video portions are applied, in this signal channel, to the record amplifier 18.

While there have been described above and illustrated in the drawings various forms of circuits for maintaining synchronizing pulses and a consistent D.C. level in the direct recording of a composite signal, it will be appreciated that a number of further modifications and variations may be employed. Accordingly, the invention should be considered to include all modifications and alternative forms falling within the scope of the appended claims.

What is claimed is:

1. A system for recording and reproducing a composite video signal containing synchronizing signal portions and video signal portions, including signal recording and reproducing means including a magnetic head having minimal frequency response above a predetermined frequency level, means for providing the composite video signal to the recording and reproducing means, means responsive to the composite video signal for selecting the synchronizing signal portions, means responsive to the selection of synchronizing signals for applying an oscillatory signal having a frequency no greater than the predetermined frequency level to the recording and reproducing means during the synchronizing signal intervals, means responsive to signals reproduced by the recording and reproducing means for selecting the oscillatory signals, and means responsive to the selection of oscillatory signals for reinserting synchronizing signal portions into the composite video signal.

2. A system for recording and reproducing signals including the combination of a magnetic tape recording and reproducing system for recording the input signals, means responsive to selected characteristics in the input signals for substituting oscillatory bursts of a selected frequency for parts of the input signals, means responsive to the reproduced signals for identifying the occurrence of the oscillatory bursts, and means responsive to the identification of the occurrence of oscillatory bursts for reinserting the selected signal characteristics into the reproduced signal.

3. A magnetic tape system for recording and reproducing composite signals which include timing signals comprising: controllable means for recording the composite signals; means responsive to the timing signals and coupled to control the controllable means for substituting oscillatory bursts of a selected frequency for the timing signals, means for reproducing the recorded signals, means responsive to the reproduced signals for identifying the occurrence of oscillatory bursts, and means responsive to the identification of oscillatory bursts at the selected frequency for reinserting the timing signals into the reproduced signals.

4. A system for recording a composite video signal containing synchronizing signal portions and video signal portions and for reproducing the signal with a consistent D.C. level, the system including a magnetic transducer having minimal frequency response above a predetermined frequency level, means for providing the composite video signal to the magnetic transducer, means responsive to the synchronizing signal portions of the composite video signal for selecting the synchronizing signals, bias oscillator means coupled to the magnetic transducer for normally biasing the magnetic transducer with an oscillatory signal above the predetermined frequency level, the bias oscillator means being controllable to shift to a lower frequency level no greater than the predetermined frequency level, and being coupled to be controlled by the means for selecting synchronizing signals, means coupled to the magnetic transducer for detecting the occurrence in reproduced signals of oscillatory signals at the lower frequency level of the bias oscillator means, means responsive to the reproduced composite television signal and responsive to the detection of oscillatory signals for selectively restoring the composite video signal to a selected D.C. level, and synchronizing signal adder means responsive to the detecting means and coupled to receive signals from the means for restoring the D.C. level to reinsert synchronizing signals into the composite video signal.

5. A magnetic tape system for recording and reproducing composite video signals containing synchronizing signal portions and video signal portions, including the combination of a magnetic head associated with the magnetic tape for recording and reproducing signals, the magnetic head having a limited frequency response between a first frequency level and a second higher frequency level, frequency shift keyed bias oscillator means having a normal operating frequency above the second level and coupled to bias the magnetic head, the bias oscillator means also being selectively actuable to operate at a selected frequency between the first and second frequency levels in response to control input signals, synchronizing signal stripper means coupled to receive the composite video signal and to provide control input signals to the bias oscillator means during the occurrence of synchronizing signals in the composite video signals, thus to provide oscillatory bursts at the selected frequency during the synchronizing signal intervals, bandpass filter means coupled to receive the composite video signals and to pass those video signal portions falling below a third frequency level which is below the first frequency level, signals passed by the bandpass filter means being coupled to the magnetic head, frequency selective amplifier means coupled to receive signals reproduced by the magnetic head and being responsive to oscillatory bursts at the selected frequency, envelope detector means coupled to the frequency selective amplifier means and providing signals having pulse envelopes corresponding to the synchronizing signals, clamped amplifier means coupled to receive signals reproduced by the magnetic head and operable to restore the reproduced signals to a selected D.C. level in response to control input signals, clamp driver means coupled to receive the signals having pulse envelopes from the detector means and to the control input of the amplifier means to control D.C. restoration in accordance with the pulse envelope intervals, and synchronizing signal adder means coupled to receive output signals from the clamped amplifier means and controlled by the signals having pulse envelopes from the detector means, to reinsert the synchronizing signals into the signals from the amplifier means, thus to reconstitute the composite video signal.

6. A system for recording composite signals to provide accurate representations of timing pulses in a manner such that the timing pulses may be reproduced by a magnetic head having limited low frequency response, comprising A.C. bias means coupled to the magnetic head and normally providing a bias frequency in excess of the upper limit of the frequency response of the magnetic head, means responsive to the timing pulses and coupled to control the A.C. bias means, to shift the operating frequency of the A.C. bias means to a lower frequency level which is within the frequency response limits of the magnetic head, thus to substitute oscillatory bursts for the timing pulses, and means for coupling the composite television signal to the magnetic head, whereby the television signal is recorded with oscillatory bursts in place of the timing pulses.

7. A system for recording composite television signals to provide accurate representations of synchronizing signals suitable for reproduction with a magnetic head having primarily high frequency response, comprising: a keyed frequency shift bias oscillator coupled to the magnetic head and normally operating at a frequency in excess of the frequency response of the magnetic head, a synchronizing stripper circuit coupled to receive the composite television signal and to provide stripped synchronizing signals, means coupling the stripped synchronizing signals to the bias oscillator to shift the bias frequency to a lower level which is in the frequency response range of the magnetic head, and means coupling the composite television signal to the magnetic head.

8. A system for recording composite television signals, including synchronizing signals on magnetic tape with a magnetic head having good high frequency response but limited low frequency and D.C. response, including a magnetic tape recording device comprising a magnetic head having substantially little response to applied signals at 10 mc. and appreciable response to applied signals at 5 mc., means providing composite television signals in which the video portion is in a frequency band which extends up to a third frequency lower than the second, a frequency shift keyed bias oscillator having a control input and normally operating at 10 mc. in the absence of control input signals, and operating at 5 mc. in the presence of control input signals, synchronizing signal stripper circuit means coupled to receive the composite television signal and to provide stripped synchronizing signal portions, the stripped synchronizing signals being coupled as control input signals to the bias oscillator, and bandpass filter means having an upper frequency limit of approximately 4 mc. coupling the composite television signals to the magnetic head.

9. A system for recording composite signals which include timing pulses, including a magnetic recording device utilizing a magnetic head having substantially little response to applied signals at a first frequency and appreciable response to applied signals at a second, lower, frequency, means providing composite signals to the magnetic head, controllable A.C. bias means normally operating at substantially the first frequency in the absence of control input signals, and operating at substantially the second frequency in the presence of control input signals, the bias means being coupled to the magnetic head, means responsive to the timing pulses for providing control input signals to the bias means and means coupling the composite signals to the magnetic head for limiting the signals which are applied to the magnetic head from the composite signals to an upper frequency limit which is below the second frequency.

10. A system for reproducing composite signals recorded on magnetic tape with timing signal portions being defined by oscillatory bursts of a selected frequency, the system including frequency sensitive amplifier means responsive only to oscillatory bursts of the selected frequency, means coupled to the frequency selective amplifier means for providing timing pulses corresponding to the original timing pulses, D.C. restoration means coupled to receive reproduced composite signals and operable in response to the timing pulses, and means coupled to the D.C. restoration means and coupled to receive the timing pulses for reinserting the timing pulses into the composite signal.

11. A system for reproducing composite television signals recorded on magnetic tape, in which synchronizing signal portions are recorded as high frequency oscillatory bursts, including frequency selective amplifier means responsive substantially only to the high frequency oscillatory bursts, a synchronizing signal detector circuit coupled to the frequency selective amplifier means and providing synchronizing signals having pulse envelopes in response to the high frequency oscillatory bursts, D.C. restoration means operable at intervals controlled by the pulse envelopes and having a signal input coupled to receive the composite television signals and synchronizing signal adder means coupled to receive signals from the D.C. restoration means and the synchronizing signals having pulse envelopes from the synchronizing signal detector means, to reinsert the synchronizing signal into the composite television signal.

12. A system for reproducing composite television signals recorded on magnetic tape, in which recording synchronizing pulses are recorded as high frequency oscillatory bursts of a selected frequency, the system comprising frequency selective amplifier means coupled to receive the reproduced signals and responsive substantially only to the oscillatory bursts of the selected frequency, a detector circuit coupled to the frequency selective amplifier means and providing synchronizing pulse envelopes in response to the oscillatory bursts, D.C. restoration means coupled to receive the reproduced composite signals and operating cyclically in response to the synchronizing pulses, and synchronizing pulse adder means coupled to receive signals from the D.C. restoration means and also the synchronizing pulses, to reinsert the synchronizing pulses into the composite signals in their original relation to the other portions of the composite signals.

References Cited by the Examiner

UNITED STATES PATENTS

| | | | |
|---|---|---|---|
| 2,242,633 | 5/41 | Toulon | 178—7.5 |
| 2,867,685 | 1/59 | Johnson | 178—6.6 |
| 2,979,558 | 4/61 | Leyton | 178—6.6 XR |

DAVID G. REDINBAUGH, *Primary Examiner.*

ROY LAKE, *Examiner.*